(12) United States Patent
Jorgensen

(10) Patent No.: US 7,950,492 B2
(45) Date of Patent: May 31, 2011

(54) WIPER CONTROL ARRANGEMENT

(75) Inventor: Chad K. Jorgensen, Byron, MN (US)

(73) Assignee: Caterpillar Forest Products Inc., Peoria, IL (US)

( * ) Notice: Subject to any disclaimer, the term of this patent is extended or adjusted under 35 U.S.C. 154(b) by 219 days.

(21) Appl. No.: 12/261,923

(22) Filed: Oct. 30, 2008

(65) Prior Publication Data

US 2010/0109380 A1    May 6, 2010

(51) Int. Cl.
*B62D 33/073* (2006.01)

(52) U.S. Cl. ........ 180/326; 180/315; 180/329; 180/333; 296/190.01; 296/190.1; 296/65.06; 297/344.21; 297/344.22

(58) Field of Classification Search .................. 180/315, 180/326, 329, 333; 296/190.01, 190.1, 65.06; 297/344.21, 344.22
See application file for complete search history.

(56) References Cited

U.S. PATENT DOCUMENTS

| | | | |
|---|---|---|---|
| 3,831,699 A | 8/1974 | Wolter | |
| 3,891,003 A | 6/1975 | Duttarer et al. | |
| 4,007,958 A * | 2/1977 | Peifer et al. | 296/190.1 |
| 4,144,614 A | 3/1979 | Barbee | |
| 4,372,341 A | 2/1983 | Crawley | |
| 5,092,408 A | 3/1992 | Tatara et al. | |
| 5,722,108 A | 3/1998 | Sakyo et al. | |
| 5,734,243 A | 3/1998 | Pabla et al. | |
| 6,149,228 A * | 11/2000 | O'Neill et al. | 296/190.03 |
| 6,450,284 B1 | 9/2002 | Sakyo et al. | |
| 6,971,471 B2 | 12/2005 | Baker et al. | |
| 7,159,687 B2 | 1/2007 | Dunn et al. | |
| 7,243,756 B2 * | 7/2007 | Muraro | 180/326 |
| 7,576,658 B2 * | 8/2009 | Ishikawa | 340/602 |
| 7,681,686 B1 * | 3/2010 | Klas et al. | 180/331 |
| 2007/0210898 A1 * | 9/2007 | Berglund et al. | 340/310.11 |

* cited by examiner

*Primary Examiner* — Faye M. Fleming
*Assistant Examiner* — Barry Gooden, Jr.
(74) *Attorney, Agent, or Firm* — Leydig, Voit & Mayer

(57) ABSTRACT

An operator's station for a machine having at least two stations comprises a seat mounted to swivel between at least a first position and a second position, at least first and second windshield portions disposed generally opposed or at an angle to one another and generally corresponding to the first and second positions, and at least first and second windshield wipers movably mounted to selectively sweep the first and second windshield portions, respectively. At least one control device selectively renders the first windshield wiper selectively operable when the seat is disposed in the first position and inoperable when the seat is disposed in the second position.

20 Claims, 6 Drawing Sheets

WIPER CONTROL ARRANGEMENT

TECHNICAL FIELD

This patent disclosure relates generally to an operator station of a machine, and, more particularly, to a windshield wiper control arrangement for an operator station of a machine.

BACKGROUND

In the forestry industry, it is common for trees to be cut down in the woods and then hauled to a central collection point for further processing. One type of machine used for loading and transporting logs is typically referred to as a log forwarder or, simply, a forwarder. A forwarder typically includes a frame that can be unitary or articulated in one or more locations and is supported on a plurality of wheels or other ground engaging members. An operator station or cab is mounted onto a portion of the frame. The operator cab typically includes a seat that is mounted to swivel between a forward facing position from which the operator can drive the forwarder, and one or more generally rearward or sideward facing positions from which the operator may operate an articulated arm or boom to load previously cut logs into a payload portion of the forwarder for further transport.

Forwarders often operate in heavily forested areas, and areas where dirt and debris may collect on one or more of the machine windshields. Rain, snow, condensation or debris may cause wear to the windshield surface over time, which can be a particular concern if the windshield is formed of a plastic material. As a result, it is desirable to minimize operation of such wipers, particularly if not all of the windshields are in use at a given time. Moreover, in forwarders, controls are typically located near the windshields themselves. Accordingly, the operator must reach to the individual wiper controls to activate the wipers, distracting the operator from the other machine controls.

U.S. Pat. No. 5,734,243 discloses a vehicle that includes right and left side driver stations with dual operator controls for the wiping mechanism. The '243 patent additionally provides a selector means that is operative to provide use of one control to the exclusion of the other so that the driver can operate the wiping mechanism, regardless of which of the driver stations the driver is using.

The present disclosure is directed to overcoming one or more of the problems and shortcomings of the art as set forth above.

SUMMARY

The disclosure describes, in one aspect, an operator's station comprising a seat mounted to swivel between at least a first position and a second position, and at least first and second windshield portions disposed generally opposed or at an angle to one another and generally corresponding to the first and second positions. At least first and second windshield wipers are movably mounted to selectively sweep the first and second windshield portions, respectively. At least one control device selectively renders the first windshield wiper selectively operable when the seat is disposed in the first position and inoperable when the seat is disposed in the second position.

In another aspect, the disclosure describes a machine comprising a frame, at least two ground engaging members supporting the frame, and an operator's station disposed on the frame. The operator's station includes a seat mounted to swivel between at least a first position and a second position. At least first and second windshield portions are disposed generally opposed or at an angle to one another and generally corresponding to the first and second positions. Each windshield portion includes an outside surface. At least first and second windshield wipers are movably mounted to selectively sweep the first and second windshield portions, respectively. At least one control device selectively renders the first windshield wiper selectively operable when the seat is disposed in the first position and inoperable when the seat is disposed in the second position.

In yet another aspect, the disclosure provides a method of operating an operator's station that includes the steps of disposing the seat in a first position generally facing a first windshield portion that includes at least a first windshield wiper disposed to selectively sweep an outside surface of said first windshield portion, swiveling the seat to a second position generally facing a second windshield that includes at least a second windshield wiper disposed to selectively sweep an outside surface of said second windshield, the first and second windshields being disposed in different planes, and actuating at least one control device as the seat swivels to render the first windshield wiper selectively operable when the seat is disposed in the first position and inoperable when the seat is disposed in the second position.

DETAILED DESCRIPTION

This disclosure relates to a control arrangement for a wiper mechanism for a machine that includes workstations wherein the operator's support is pivoted between different positions. The term "machine" as used in this disclosure may refer to any machine that performs some type of operation associated with an industry such as mining, construction, farming, transportation, or any other industry known in the art wherein the operator's support pivots to varied positions. For example, the machine may be a forwarder, a backhoe, a bi-directional agricultural tractor, or the like. Moreover, an implement may be connected to the machine. Such implements may be utilized for a variety of tasks, including, for example, loading, compacting, lifting, brushing, and include, for example, arms, booms, buckets, compactors, forked lifting devices, brushes, grapples, cutters, shears, blades, breakers/hammers, augers, and others.

Figure 1:
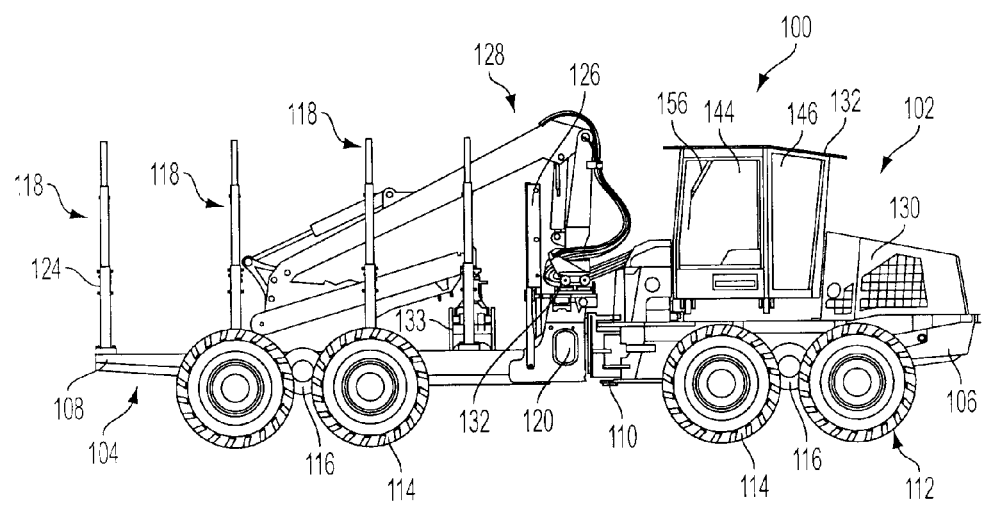
FIG. 1 and FIG. 2 are outline views from different perspectives of a log forwarder in accordance with the disclosure.
Figure 2:
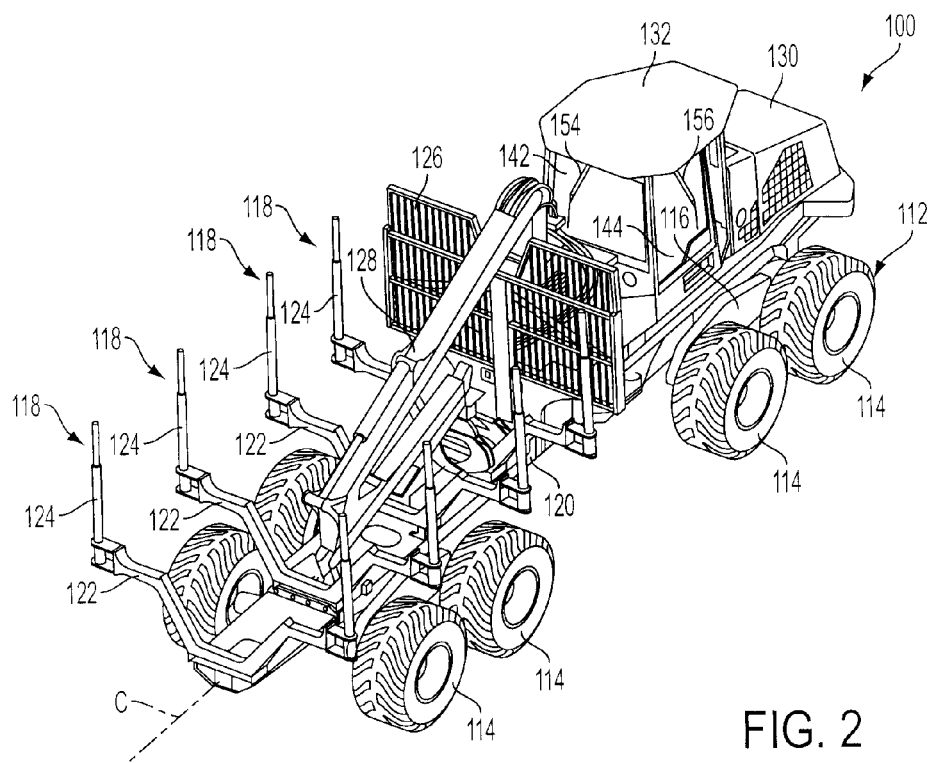

Two outline views from different perspectives of a machine 100 are shown in FIG. 1 and FIG. 2. FIG. 1 is a side view of the machine 100 and FIG. 2 is a three-quarter view from the rear. In the illustrations of FIG. 1 and FIG. 2, the machine 100 is a forwarder 102. In the illustrated forwarder 102 includes an articulated frame 104 having an engine frame portion 106 and a payload frame portion 108 connected to one another at a pivot joint 110. In an alternate embodiment, the frame 104 may be a rigid frame with no articulated connections between portions thereof or, alternatively, with more than one articulated joint connecting three or more frame portions to one another. Each of the engine frame portion 106 and payload frame portion 108 includes ground engaging members 112, here, four driven wheels 114 for a total of eight driven wheels 114. The eight driven wheels 114 are arranged in pairs, and each pair is arranged on a tandem drive beam 116. Four such tandem drive beams 116 are included with the forwarder 102 to provide traction and stability when traversing rough and/or uneven terrain. Although a forwarder 102 including eight driven wheels 114 is illustrated, the machine 100 could alternately include only four or six wheels. As with the illustrated embodiment, all or a portion of the wheels 114 may be driven. Alternate ground engaging members 112 may include, for example, track mechanisms.

The payload portion 108 of the illustrated embodiment includes four bunks 118 that are arranged along the payload frame portion 108 and extend from a segment thereof that is adjacent to the base 120 along the length of the payload frame portion 108. Each of the four bunks 118 has a flattened Y-shape having base 122 extending horizontally away from a longitudinal centerline, C, of the forwarder 102 and a pair of posts 124 extending upwardly. When logs or other elongate cargo is loaded on the forwarder 102, the four bunks 118 are disposed to retain and align the cargo onto and over the payload frame portion 108 within the space between each pair of posts 124. A headboard 126 is connected to the payload frame portion 108 and extends in a generally vertical direction away from the articulated frame 104. The headboard 126 provides a bumper or stop that protects the base 120 and the crane 128 from impacts with logs being loaded on the forwarder 102 while also providing a surface that the operator can use to "bump" and align the logs being loaded.

In the illustrated embodiment, the engine frame portion 106 supports a prime mover (not visible) beneath an engine cover 130 and a cab or operator station 132. The forwarder 102 may include any appropriate prime mover for movement of the forwarder 102 and operation of the various systems. For example, the prime mover may be an engine. A drive system using electrical or mechanical power may be used to operate the driven wheels 114. Alternately, the drive system may include hydrostatic motors associated with the eight driven wheels 114. A hydraulic system may further be provided to operate hydrostatic actuators are also used to actuate the boom or crane 128. The crane 128 is connected to the frame 104 at one end and is provided with a grapple assembly 133 at the opposite end.

Figure 3:
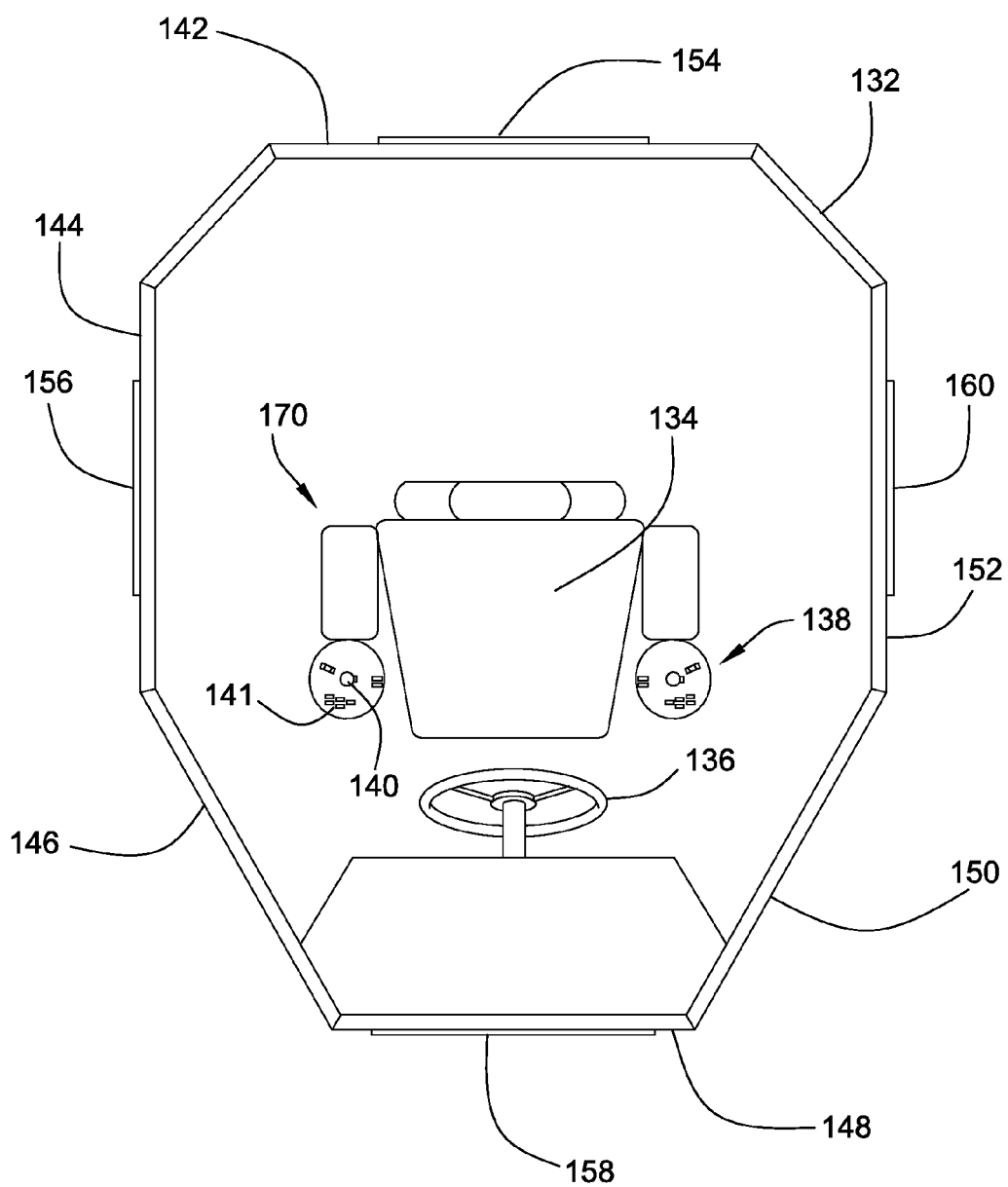
FIG. 3 is an enlarged, fragmentary, schematic plan view of the operator station of the log forwarder of FIGS. 1 and 2 broken away to show the seat assembly.

Referring to FIG. 3, the operator station 132 includes a seat 134, and a plurality of machine controls for operation of the various operations of the forwarder 102. The machine controls may include, for example, a steering wheel 136, and/or control mechanisms 138 disposed on the arms of the seat 134 itself, such as one or more joysticks 140, buttons 141, or switches. To allow the operator to view the environment forward, to the sides, and to the rear, the operator station 132 includes a plurality of windshields 142, 144, 146. While only three windshields are visible in FIGS. 1 and 2, windshields 142, 144, 146, 148, 150, 152 may be provided about the operator station 132, as shown in the fragmentary schematic plan view of the operator station 132 in FIG. 3. Further, two or more of the windshields 142, 144, 146, 148, 150, 152, here, four such windshields are provided with at least one respective windshield wiper 154, 156, 158, 160.

Figure 4:
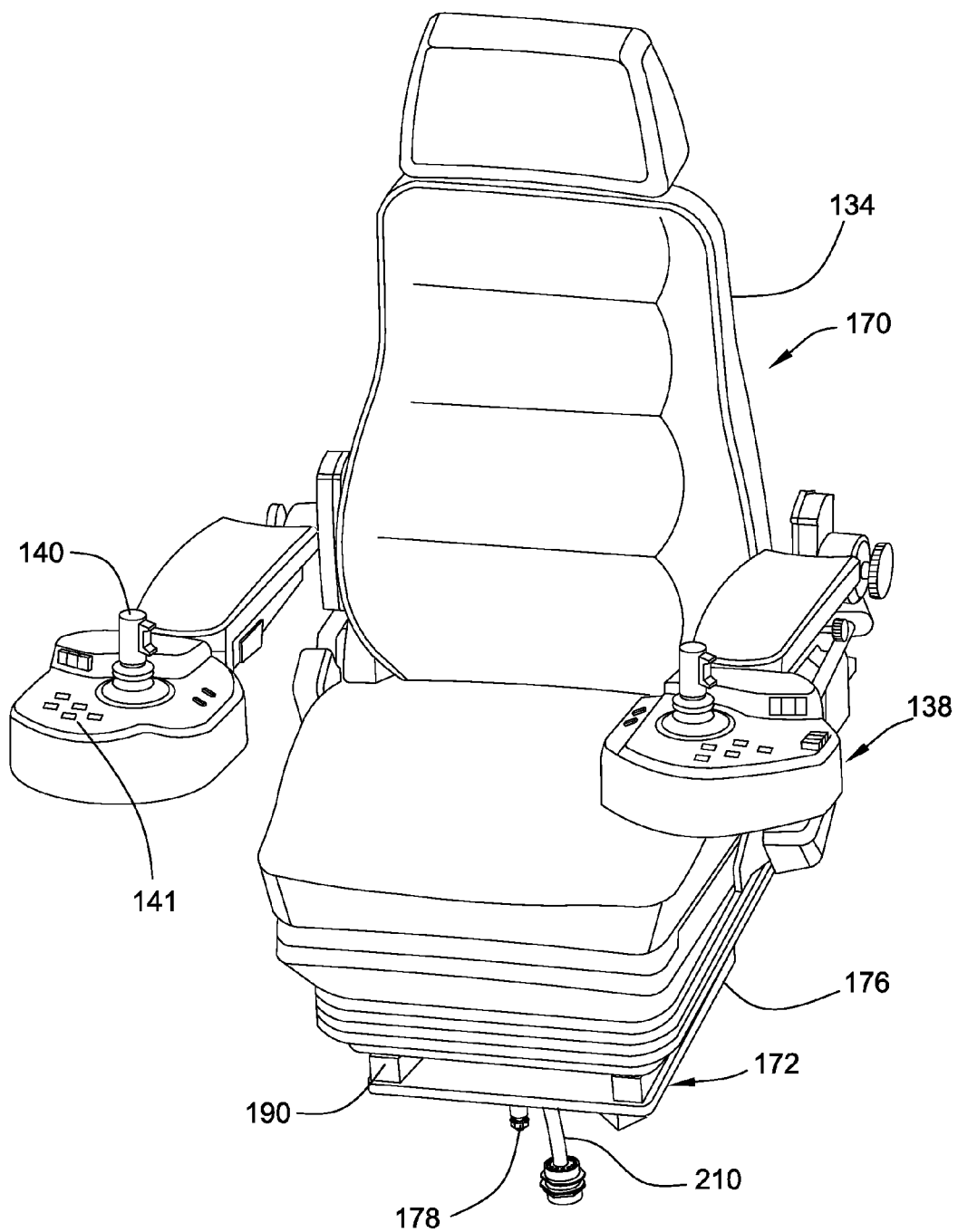
FIG. 4 is a perspective view of a seat assembly for use in the log forwarder illustrated in FIG. 1 and FIG. 2, in accordance with the disclosure.

To facilitate driving the machine 100 as well as the operator's use of the crane 128, the seat 134 is pivotally mounted within the operator station 132 such that it may be pivoted selectively and at least partially between forward and rearward facing positions. The mounting may be accomplished by any appropriate arrangement. For example, the seat assembly 170, as may be seen in FIG. 4, in addition to the seat 134 itself, may include a base 172 having a stationary portion 174 that is secured to the floor of the operator station 132, and a rotating portion 176 to which the seat 134 is secured (see FIGS. 5 and 6). In this embodiment, the stationary portion 174 is a generally circular structure that is mounted to the floor of the operator station 132 by a plurality of threaded projections 178 and associated nuts 180. Washers 182 or the like may be provided to inhibit the nuts 180 from unthreading.

The rotating portion 176 here includes a generally planar structure or plate 184 that is coupled to the stationary portion 174 by a plurality of mounting flanges or brackets 186. The brackets 186 are removably coupled to the plate 184 by rivets, screws 188, or the like. Ball bearings or the like (not visible) may be disposed between the stationary portion 174 and the plate 184 to provide smooth motion of the seat 134 as it pivots.

The seat 134 itself is mounted to the plate 184 by any appropriate means. In this embodiment, the rotating portion 176 includes a pair of longitudinally extending mounting bars 190 to which the seat 134 is mounted. While the seat assembly 170 has been described with regard to the illustrated arrangement, it will be appreciated that alternate arrangements are likewise appropriate with regard to the appearance, seat structure, and mounting structure, among other things.

In order to minimize unnecessary usage of the wipers 154, 156, 158, 160, selective operation of the wipers 154, 156, 158, 160 is provided, based upon the needs or desires of the operator, on the safety of the operator and on the safe usage of the machine. Accordingly, the operator station 132 includes controls that enable operation of a limited number of the wipers 154, 156, 158, 160, depending upon the direction in which the seat 134 is facing. For example, if the seat 134 is facing generally forward, that is, toward the steering wheel 136 and front windshield 148, the front wiper 158 is operative, and the rear, right, and left side wipers 154, 156, 160 are inoperative. Conversely, if the seat 134 is facing generally rearward or sideward, the rear, right and left side wipers 154, 156, 160 are operative, while the front wiper 158 is not. Further, the wiper arrangement may be provided with additional functionality beyond a conventional on/off arrangement such that actuation may provide a limited number of sweeps, such as a single sweep of the wipers 154, 156, 158, 160. In this way, the operator's actuation of the appropriately enabled wipers 154, 156, 158, 160 would yield, for example, a single sweep of the wipers across only the windshields 142, 144, 148, 152 in use.

Figure 5:
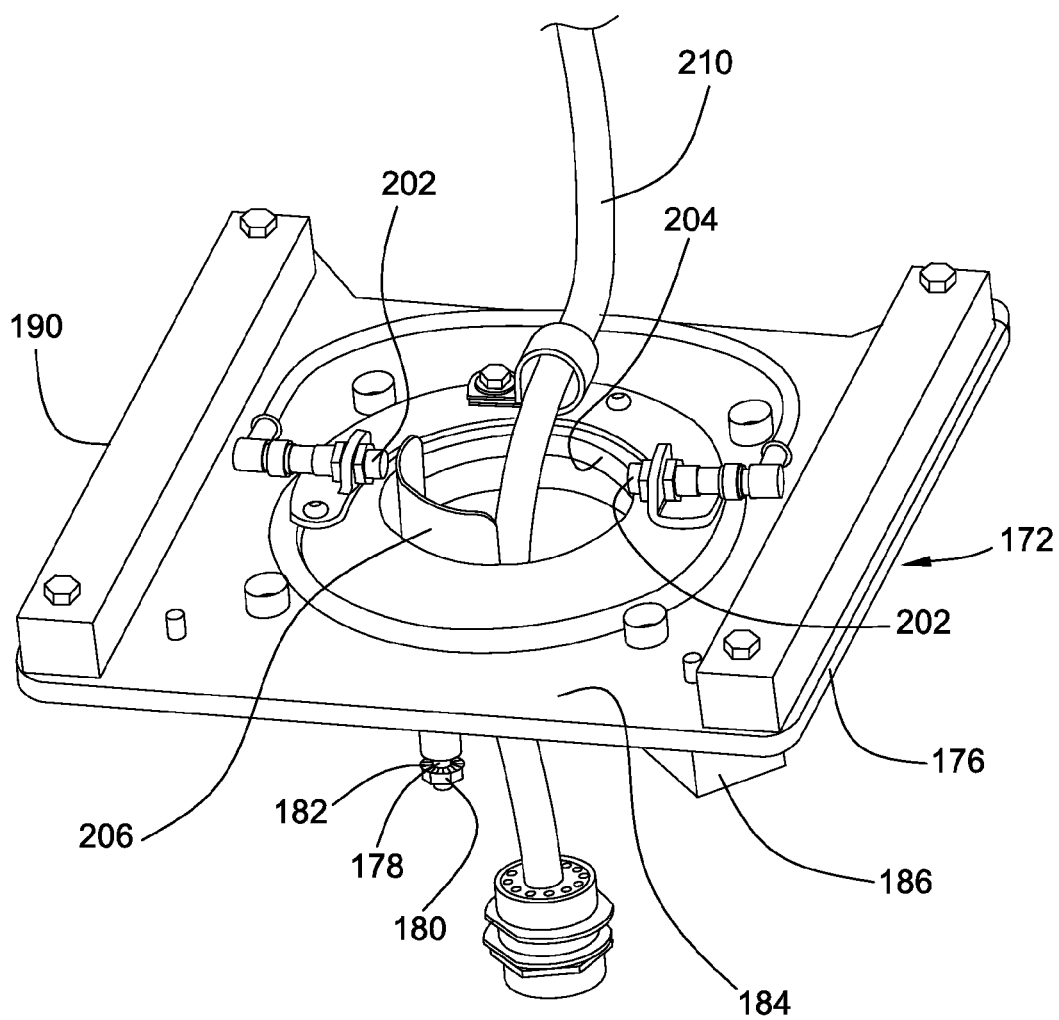
FIG. 5 is an enlarged fragmentary perspective view of the mounting assembly for the seat assembly of FIG. 4.
Figure 6:
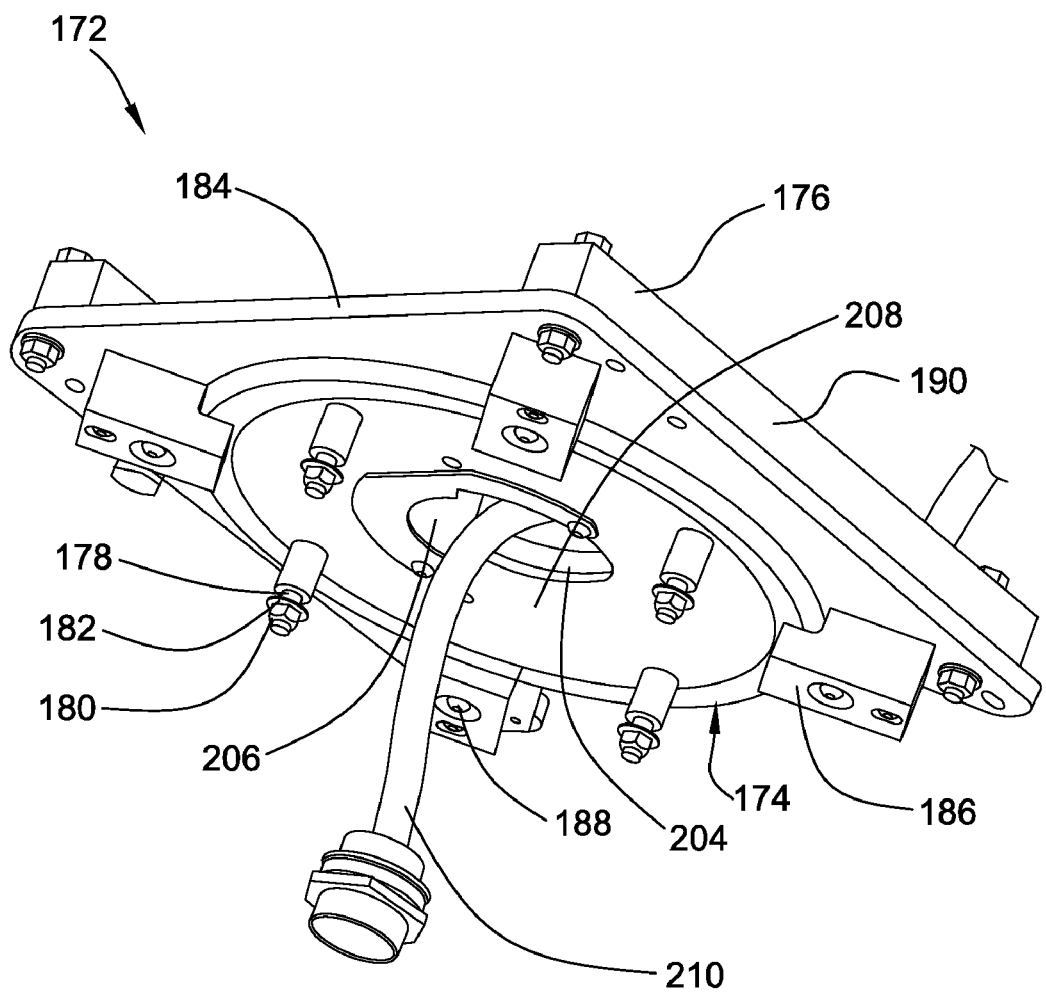
FIG. 6 is a further enlarged fragmentary perspective view of the mounting assembly of FIG. 5.

This limited operation of the wipers 154, 156, 158, 160 may be provided by any appropriate mechanism. Referring to FIGS. 5 and 6, in the illustrated embodiment, the seat assembly 170 is provided with a plurality of control devices, such as proximity sensors 200, 202, here, two such sensors 200, 202, which are coupled to the rotating portion 176. The plate 184 of the rotating portion 176 is provided with a central opening 204 through which a stationary flange 206 protrudes. Here, the stationary flange 206 is coupled to the stationary portion 174, although is could alternatively be coupled, such as, to the floor of the operator station 132. The stationary flange 206 may likewise include a central opening 208 to allow the passage of cables or the like, if desired. Here, the sensors 200, 202 are electrically connected to the wiper control mechanisms 138 disposed in the seat assembly 170 by an electrical bus 210 that extends through the openings in both the stationary portion 174 and the rotating portion 176, and other electrical connections. As the seat 134 and the plate 184 to which it is coupled rotate, the flange 206 actuates one or the other of the proximity sensors 200, 202, depending upon the position of the rotating portion 176. The proximity sensors 200, 202 are disposed and electrically connected and the flange 206 is disposed such that one of the sensors 200 allows operation of the front wiper 158 upon proximity actuation by the flange 206, while the other sensor 202 allows operation of the rear, right, and left side wipers 154, 156, 160 upon proximity actuation by the flange 206. In this way, the control mechanisms 138 located in the seat assembly 170 are operative to actuate only one or the other of the front wiper 158 or the rear, right, and left wipers 154, 156, 160, depending upon the swiveled location of the seat assembly 170.

It will be appreciated that the arcuate nature of the flange 206 enables operation of the wipers 154, 156, 158, 160 associated with the actuated proximity sensors 200, 202 when the seat is disposed at a range of angles, rather than only precisely forward facing or rearward facing. This arrangement allows the operator to adjust the seat 134 to a desired location and still actuate the appropriate wipers while providing the operator some flexibility in the exact positioning of the seat 134. For example, an operator may prefer to operate the crane 128 with the seat 134 facing slightly to one side or the other, based upon the location of logs to be moved in to the payload portion 108 of the forwarder 102.

Further, while two sensors 200, 202 are illustrated, a fewer or greater number of sensors or the like may be provided. For example, a first sensor may be provided to activate and a second sensor to deactivate the front wiper 158; a third sensor may be provide to activate and a fourth to deactivate the rear, right and left side wipers 154, 156, 160.

Figure 7:
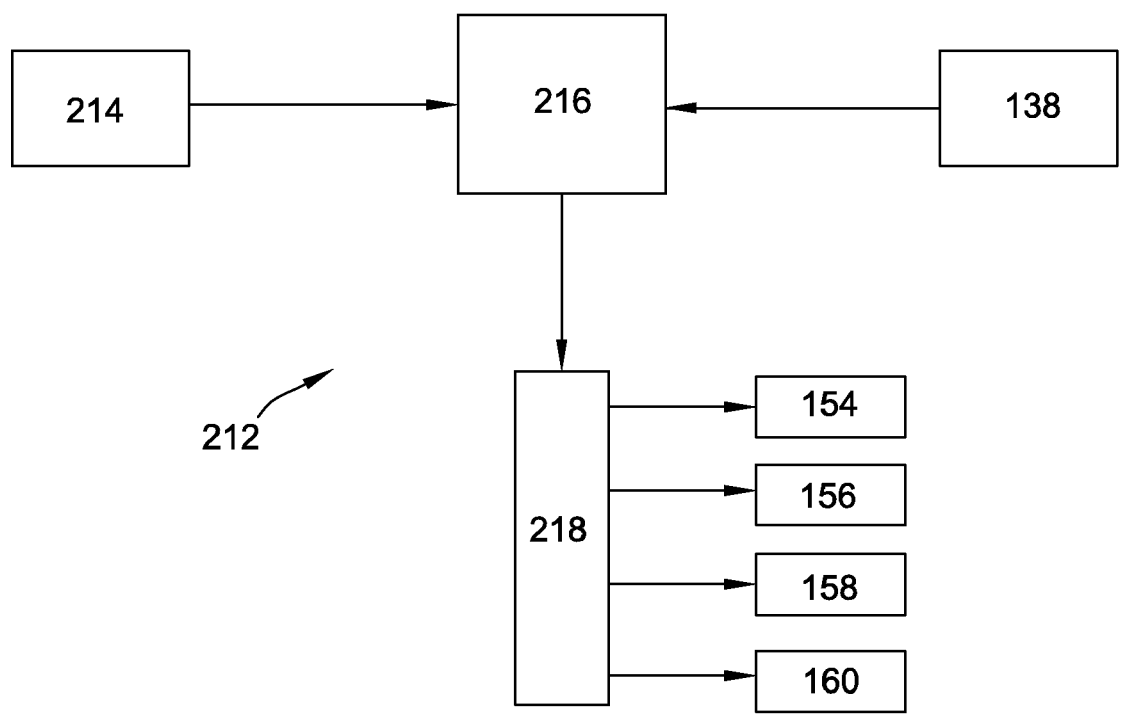
FIG. 7 is a schematic diagram illustrating the control arrangement for operation of the wipers of the log forwarder of FIGS. 1-3.

A schematic diagram of FIG. 7 illustrates a representative control arrangement 212 for controlling the operation of the wipers 154, 156, 158, 160. A control device 214 creates a control signal as a result of the swiveling of the is created as a result of the rotating portion 176 relative to the stationary portion 174. In the embodiment of FIGS. 5-6, the control device 214 includes the sensors 200, 202 and the flange 206. Alternate arrangements are equally appropriate. By way of example only, one or more mechanical switches or the like may be provided such that the swiveling of the rotating portion 176 causes activation and/or deactivation of the switches.

Returning to FIG. 7, the control signal from the control device 214 is provided to a control unit 216, which may be in the form of a central processing unit, a microprocessor, or another controller. The control unit 216 then provides signals to the relays 218, which in turn activate the appropriate wiper(s) 154, 156, 158, 160 to allow further actuation by the operator by way of appropriate control mechanisms 138. It will be appreciated that alternate control arrangements may be provided, and that the illustrated control arrangement 212 is provided merely by way of example.

INDUSTRIAL APPLICABILITY

The present disclosure is applicable to machines 100 having a seat 134 that swivels between two or more stations and at least one wiper 154, 158 at each of the stations. In an embodiment, the disclosed arrangement may be utilized on machines 100 having greater than two windshields and associated wipers.

In an embodiment, the arrangement may be utilized in conjunction with traditional wiper controls. For example, the arrangement may include controls for the enabled wipers 154, 158 that allow the wipers 154, 158 to be switched on continuously, intermittently, and/or as a single or other controlled number of sweeps. Controls may be provided whereby the operator may actuate each of the wipers individually, or as a group. In an embodiment, a control arrangement 212 may be provided wherein actuation of a control mechanism 138 results in a preselected number of swipes of the wiper(s), as, for example, a single swipe.

Activation of a limited number of the wipers 154, 156, 158, 160 based upon seat 134 location may result in reduced wear on the wiper blade and the associated windshields 142, 144, 148, 152. Placement of the wiper control mechanisms 138 along the seat 134 itself may result in reduced distraction to an operator during use.

Some embodiments may be economically manufactured, and/or may be readily incorporated into such machines 100.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated. All methods described herein can be performed in any suitable order unless otherwise indicated herein or otherwise clearly contradicted by context.

I claim:

1. An operator's station comprising
a seat mounted to swivel between at least a first position and a second position,
at least first and second windshields disposed generally opposed or at an angle to one another and generally corresponding to the first and second positions,
at least first and second wipers movably mounted to selectively sweep the first and second windshields, respectively, and
at least one control device selectively rendering the first wiper selectively operable when the seat is disposed in the first position and inoperable when the seat is disposed in the second position.

2. The operator's station of claim 1 wherein the at least one control device includes at least one of a proximity sensor and a switch activated as the seat swivels.

3. The operator's station of claim 1 wherein the at least one control device selectively renders the second wiper selectively operable when the seat is disposed in the second position and inoperable when the seat is disposed in the first position.

4. The operator's station of claim 3 wherein the at least one control device includes at least a second control device selectively rendering the second wiper selectively operable when the seat is disposed in the second position and inoperable when the seat is disposed in the first position.

5. The operator's station of claim 1 wherein the first and second windshields are disposed substantially opposed to one another, the seat being disposed therebetween.

6. The operator's station of claim 5 further including third and fourth opposed side windshields extending generally between the first and second windshields, and third and fourth wipers movably mounted to selectively sweep the third and fourth opposed side windshields, respectively.

7. The operator's station of claim 6 wherein the second position includes an arc of a plurality of positions wherein the seat is generally facing any of the second or side windshields, and the at least one control device selectively renders the second, third and fourth wipers selectively operable when the seat is disposed in the second position and inoperable when the seat is disposed in the first position.

8. A machine comprising
   a frame,
   at least two ground engaging members supporting the frame,
   an operator's station disposed on the frame, the operator's station including
      a seat mounted to swivel between at least a first position and a second position,
      at least first and second windshields disposed generally opposed or at an angle to one another and generally corresponding to the first and second positions, each said windshield including an outside surface,
      at least first and second wipers movably mounted to selectively sweep the first and second windshields, respectively, and
      at least one control device selectively rendering the first wiper selectively operable when the seat is disposed in the first position and inoperable when the seat is disposed in the second position.

9. The machine of claim 8 wherein the at least one control device includes at least one of a proximity sensor and a switch actuated as the seat swivels.

10. The machine of claim 8 wherein the at least one control device selectively renders the second wiper selectively operable when the seat is disposed in the second position and inoperable when the seat is disposed in the first position.

11. The machine of claim 10 wherein the at least one control device includes at least a second control device selectively rendering the second wiper selectively operable when the seat is disposed in the second position and inoperable when the seat is disposed in the first position.

12. The machine of claim 8 wherein the first and second windshields are disposed substantially opposed to one another, the seat being disposed therebetween.

13. The machine of claim 12 further including third and fourth opposed side windshields extending generally between the first and second windshields, and third and fourth wipers movably mounted to selectively sweep the third and fourth opposed side windshields, respectively.

14. The machine of claim 13 wherein the second position includes an arc of a plurality of positions wherein the seat is generally facing any of the second or side windshields, and the at least one control device selectively renders the second, third and fourth wipers selectively operable when the seat is disposed in the second position and inoperable when the seat is disposed in the first position.

15. A method of operating an operator's station, the method including the steps of
   disposing a seat in a first position generally facing a first windshield, at least a first wiper being disposed to selectively sweep an outside surface of said first windshield,
   swiveling the seat to a second position generally facing a second windshield, the first and second windshields being disposed in different planes, at least a second wiper being disposed to selectively sweep an outside surface of said second windshield,
   actuating at least one control device as the seat swivels to render the first wiper selectively operable when the seat is disposed in the first position and inoperable when the seat is disposed in the second position.

16. The method of claim 15 wherein the actuating step includes actuating at least one of a proximity sensor or a switch.

17. The method of claim 15 wherein the actuating step renders the second wiper selectively operable when the seat is disposed in the second position and inoperable when the seat is disposed in the first position.

18. The method of claim 15 further comprising the step of selectively operating the first wiper to make a single sweep of the first windshield.

19. The method of claim 15 further comprising the steps of swiveling the seat from the second position to the first position, and actuating a second control device as the seat swivels to render the second wiper selectively operable when the seat is disposed in the second position and inoperable when the seat is disposed in the first position.

20. The method of claim 19 wherein the step of actuating a second control device includes the step of actuating third and fourth wipers moveably mounted to selectively sweep third and fourth side windshields disposed in opposed positions and extending generally between the first and second windshields, the first and second windshields being disposed in positions generally opposing one another.

* * * * *